United States Patent Office 2,723,189
Patented Nov. 8, 1955

2,723,189

2-PHENYLETHYL 2-(PENTACHLOROPHENOXY)-ETHYL SULFIDE HERBICIDES

Earl W. Gluesenkamp, Dayton, Ohio, assignor to Monsanto Chemical Company, St. Louis, Mo., a corporation of Delaware No Drawing. Original application September 28, 1951, Serial No. 248,873, now Patent No. 2,689,869, dated September 21, 1954. Divided and this application January 5, 1954, Serial No. 402,400

2 Claims. (Cl. 71—2.3)

The present invention relates to organic sulfur compounds, more particularly provides a hitherto unknown series of 2-phenylethyl 2-(di- and poly-chlorophenoxy)-ethyl sulfides, methods of producing the same, herbicidal compositions containing the new sulfides and methods of destroying undesired plants in which said compositions are employed.

According to the invention there are provided organic sulfides having the formula

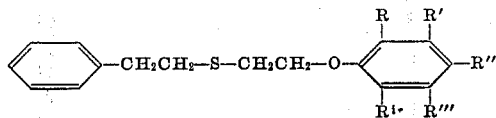

in which R, R', R'', R''' and $R^{iv}$ are selected from the class consisting of hydrogen and chlorine and in which at least two of R, R', R'', R''' and $R^{iv}$ are chlorine. Examples of compounds having the above formula are 2-phenylethyl 2-(pentachlorophenoxy)ethyl sulfide, 2-phenylethyl 2-(2,3,4,5-tetrachlorophenoxy)ethyl sulfide, 2-phenylethyl 2-(2,3,5-trichlorophenoxy)ethyl sulfide, 2-phenylethyl 2-(3,4,5-trichlorophenoxy)ethyl sulfide, 2-phenylethyl 2-(3,4-dichlorophenoxy)ethyl sulfide, 2-phenylethyl 2-(2,3-dichlorophenoxy)ethyl sulfide, etc.

The present sulfides are readily prepared by contacting a 2-[(2-phenylethyl)mercapto]ethyl chloride or bromide with a phenoxide selected from the class consisting of alkali metal dichlorophenoxides, alkali metal trichlorophenoxides, alkali metal tetrachlorophenoxides, and alkali metal pentachlorophenoxides. Examples of suitable phenoxides are sodium pentachlorophenoxide, potassium 2,3,4,5-tetrachlorophenoxide, lithium 2,3,5,6-tetrachlorophenoxide, sodium 2,3,4-trichlorophenoxide, sodium 3,4-dichlorophenoxide, potassium 2,3-dichlorophenoxide, etc. The 2-[(2-phenylethyl)mercapto]ethyl halides may be obtained by the addition reaction of styrene and 2-mercaptoethanol to yield 2-[(2-phenylethyl)mercapto]ethanol and treatment of the latter with hydrogen chloride or hydrogen bromide.

Reaction of the (phenylethyl)mercaptoethyl halides with the di- or polychlorophenoxide is effected at ordinary or increased temperatures and in the presence or absence of an inert solvent or diluent. Advantageously the present sulfides are prepared by contacting the halide with the phenoxide in the presence of an unreactive solvent such as ethanol, dioxane, acetone, methyl ethyl ketone, etc., and temperatures of from, say, 50° C. to the refluxing temperature of the reaction mixture are used. Inasmuch as the reaction involves condensation of one mole of the 2-[(2-phenylethyl)mercapto]ethyl halide with one mole of the phenoxide, these reactants are advantageously employed in stoichiometric proportions. However, an excess of either reactant may be employed since any unreacted initial material may be easily recovered from the final product.

The present 2-phenylethyl di- or polychlorophenoxyethyl sulfides are well-defined, stable compounds which range from viscous liquids to waxy or crystalline solids. They are particularly valuable as herbicides, but some of this series of compounds also may be advantageously employed as insecticides and pesticides in general, as intermediates in the manufacture of pharmaceuticals, etc.

The invention is further illustrated, but not limited, by by the following examples.

*Example 1*

A mixture consisting of 40 grams (0.2 mole) of 2-[(2-phenylethyl)mercapto]ethyl chloride, 57.7 g. (0.2 mole) of sodium pentachlorophenoxide, 170 g. of ethanol and 5 cc. of water was refluxed for six hours, at the end of which time two layers were present in the reaction mixture. The mixture was allowed to stand at ordinary room temperature for several days; then 100 cc. of acetone and an additional 5.7 g. of sodium pentachlorophenoxide was added and refluxing, with stirring, was resumed and continued for another six hours. The solvent was removed by evaporation and the oil which remained allowed to crystalize. Recrystallization from a mixture of ethanol and acetone gave 64 grams (75% theoretical yield) of the substantially pure 2-phenylethyl 2-(pentachlorophenoxy)ethyl sulfide, M. P. 50–52° C., and analyzing as follows:

|  | Found | Calcd. for $C_{16}H_{13}SOCl_5$ |
|---|---|---|
| Percent S | 6.9 | 7.4 |
| Percent Cl | 40.7 | 41.2 |

2-phenylethyl 2-(2,3,4,5-tetrachlorophenoxy)ethyl sulfide or 2-phenylethyl 2-(2,4,6-trichlorophenoxy)ethyl sulfide may be similarly prepared by substituting sodium 2,3,4,5-tetrachlorophenoxide or potassium 2,4,6-trichlorophenoxide for the sodium pentachlorophenoxide. Technical mixture of polychlorophenoxides may likewise be employed.

*Example 2*

Herbicidal activity of the 2-phenylethyl 2-(pentachlorophenoxy)ethyl sulfide of the preceding example was demonstrated as follows:

A 1% oil-in-water emulsion of the sulfide was prepared, employing cyclohexanone as solvent for the sulfide and an emulsifying agent known to the trade as "Emulsifier L" and comprising a mixture of a polyethylene glycol derivative and an alkylbenzene-sulfonate. This emulsion was further diluted with water to give an emulsion having an 0.3% concentration of the sulfide. The respective emulsions were applied to the foliage and stems of bean plants having well-developed second leaves, and the treated plants along with similar untreated plants were placed in a greenhouse for observation. At the end of two weeks plants which had been treated with the 1% and the 0.3% emulsions were found to be completely dead, while the untreated plants, maintained under like conditions of temperature, sunlight and watering were in excellent condition.

*Example 3*

Another method of testing for herbicidal efficiency of a chemical involves noting the effects on seed germination and plant growth which may be evidenced by spraying soil surfaces. This testing procedure, commonly known as "preemergence" testing, was conducted as follows.

Boxes having a 5" x 5" exposed area were partially filled with a layer of soil, and 20 seeds were placed thereon and then covered with a ¼" to ½" layer of soil which had been screened to ¼" sieve. Test boxes containing 20 seeds each of rye and cucumber seeds, respectively, were prepared. The surface soil of the seeded boxes was then sprayed, respectively, with the 0.3% and 1.0% emulsions of Example 2. The quantity of each emulsion which was applied was calculated to correspond to either 20 lbs. of the sulfide per acre or 50 lbs. of sulfide per acre. The sprayed boxes as well as similarly seeded but unsprayed test boxes were then maintained at standard conditions of temperature and watering for a period of two weeks.

At the end of that time the number of seedlings in each box was counted. The number of seedlings in the unsprayed boxes compared to the number of seedlings in the sprayed boxes was expressed as "per cent phytotoxicity."

There was evidenced from 71% to 100% phytotoxicity to cucumbers at the 50 lb./acre concentration and the same degree of phytotoxicity to rye and cucumber at both the 20 lb./acre and the 50 lb./acre concentrations of the sulfide.

The present sulfides are preferably applied to plants by spraying aqueous emulsions of the same, this method affording an easy and inexpensive way of destroying plant growth. However, they are likewise effective when applied in dusts, for example, in admixture with such carriers as clay, lime, talc, bentonite, pumice, fuller's earth, etc. The present compounds are soluble in the usual organic solvents and may be used in solution, e. g., in kerosene or benzene solution as herbicidal sprays.

The dispersions or solutions may be used to destroy already existing plant growth by direct application to the undesirable plants, or they may be employed to prevent the plant growth by application to soils. When employed to prevent plant growth, for example in parking areas, highway abutments, railway yards, etc., they may be applied either as an aqueous spray or dust or they may be admixed with customarily employed temporary surfacing materials, e. g., oils, cinders, etc. The present invention thus provides a generally useful method of preventing and destroying undesirable plant growth.

This application is a division of my copending application Serial No. 248,873, filed September 28, 1951, and issued as Patent No. 2,689,869 on September 21, 1954.

What I claim is:

1. A herbicidal composition comprising an inert carrier, and 2-phenylethyl 2-(pentachlorophenoxy)ethyl sulfide as the essential active ingredient, said sulfide being present in said composition in a quantity which is injurious to plant growth.

2. The method of destroying undesired plants which comprises applying to said plants a toxic quantity of a herbicidal composition comprising an inert carrier and 2-phenylethyl 2-(pentachlorophenoxy)ethyl sulfide.

No references cited.